United States Patent [19]
Alberti et al.

[11] 3,724,022
[45] Apr. 3, 1973

[54] CONVEYING CASTER MEANS
[75] Inventors: John Alberti, Seattle; William W. Nanninga, Bellevue, both of Wash.
[73] Assignee: The Boeing Company, Seattle, Wash.
[22] Filed: Feb. 1, 1971
[21] Appl. No.: 111,396

[52] U.S. Cl. ...................................................16/45
[51] Int. Cl. ...........................................A47b 91/00
[58] Field of Search ...........16/45, 46, 47, 48; 248/24

[56] References Cited

UNITED STATES PATENTS

| | | | |
|---|---|---|---|
| 3,047,904 | 8/1962 | Macdonald | 16/48 |
| 2,713,179 | 6/1955 | Clifton | 16/47 |

Primary Examiner—James T. McCall
Assistant Examiner—Doris L. Troutman
Attorney—Glenn Orlob, Kenneth W. Thomas and Nicolaas DeVogel

[57] ABSTRACT

A swiveling base carrying a low profile axle supporting structure with three or more caster wheels arranged in a triangular supporting and conveying pattern for distributing the load and thereby being capable of continuously achieving automatic alignment with associated receiving cargo. In addition, the feature of receiving cargo is improved by the conical edge design of the swivel base and the spring loaded mounting of the base structure.

7 Claims, 7 Drawing Figures

PATENTED APR 3 1973

INVENTORS,
WILLIAM W. NANNINGA
JOHN ALBERTI
BY

AGENT

CONVEYING CASTER MEANS

BACKGROUND OF THE INVENTION

1. Field of the Invention

This invention relates to cargo conveyor systems and more particularly to a swivelable cargo supporting caster apparatus for receiving, supporting and transferring cargo on cargo decks in aircraft.

2. Prior Art

Reviewing the existing art, there appear to be various patents concerning cargo carrying casters, and a thorough search showed that the most pertinent art relative to the present invention was found in the U.S. Pat. No. 3,047,904 issued to J. G. MacDonald.

In general, the basic design to most casters of the type discussed herein involves a mounting means, a swiveling base on the mounting means and a wheel or wheels rotating on a shaft which are supported on the swiveling base. The above-mentioned U.S. patent reference has the basic caster structures and an added feature of two mis-aligned axles which serves a particular purpose and warranted patentability.

The present invention improves over the prior art by its load carrying performance which is due to a unique triangular support means. In addition, the herein-disclosed caster takes a minimum of space as far as dimensions for installation are concerned yet has the capacity to carry 7,500 to 8,000 pounds rather than the 1,750 to 2,000 pounds carrying ability of the most efficient existing casters available.

The ability to carry such a high load is accomplished by a unique and novel solution explained hereinafter.

SUMMARY OF THE INVENTION

The present invention applies basically to cargo carrying aircraft and in this instance was designed specifically as part of the main deck cargo system for the Boeing 747B.

The conveyor caster means or caster comprises a floor-mounted base structure carrying a ring-shaped bearing. A circular axle support structure is rotationally carried by the bearing. The axle support has three axles, each provided with a cargo support wheel and the three wheels are so positioned that a triangular or three-point support is provided to associated cargo placed thereon.

This triangular support pattern formed by the three tangent points of the wheels divides the cargo in an even load carrying distribution but, also, because the pattern is located next to the diameter or almost in half the segment of the circular axle support carried by the ring bearing, the arrangement will act as a pivot for self-aligning when cargo is shoved onto it.

Thus this triangular pattern serves two main functions, load distribution and self-aligning of the caster with the cargo. In addition, there are other features which are important, such as springs provided at each corner of the mounting base so that extra resiliency is achieved when cargo is initially received from a loading platform. For instance, the 747B airplane has approximately 800 casters of the present type evenly distributed over the main deck cargo floor and the first 5 to 8 feet of the cargo entrance uses casters with the spring-loaded mounting for absorbing initial weight impact of the cargo when moved inside the airplane onto the floor.

In summary, the features which are unique to the subject invention are the low profile of the caster unit; the three-wheel triangular design arrangement accomplished within minimum space parameters for maximum effective load-carrying capability; the caster wheel protection provided by the conical design of the axle support structure which prevents cargo from hitting and damaging wheels broadside and the self-pivoting and aligning with the cargo of the axle support structure upon first contact with the approaching cargo.

It is therefore an object of the present invention to provide for a caster unit which has high load-carrying, self-aligning, low profile, and wheel protective features designed with minimum space parameters for maximum required performance.

It is another object of the present invention to provide for a cargo receiving, supporting and conveying caster having triangularly patterned, rotationally supporting means on a substantially horizontal plane.

Other objects and advantages will become apparent from the following description taken in conjunction with the accompanying drawings hereinafter explained in further detail.

DESCRIPTION OF THE INVENTION

Figure 1:
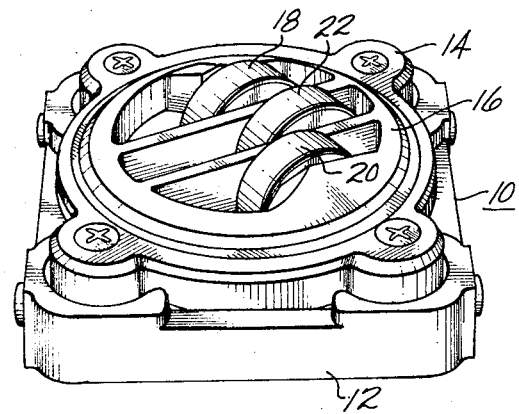
FIG. 1 is an isometric view of the caster.
Figure 2:
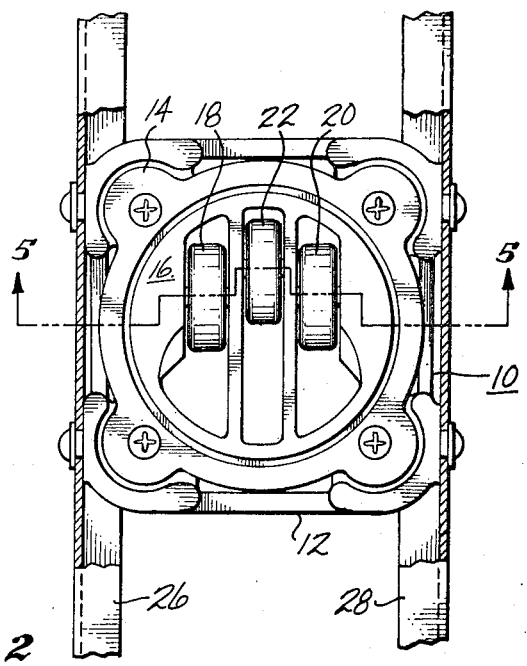
FIG. 2 is a plan view of the caster.

The drawings illustrate by way of example, not by way of limitation, two forms of the preferred embodiments of the invention wherein like reference numerals designate corresponding parts in the several views. With reference to FIGS. 1 and 2, there is illustrated a caster 10 which includes mainly a floor mounting base 12, a thereon spring mounted swiveling base structure 14, a thereon rotationally mounted circular axle support structure 16 with caster wheels 18, 20 and 22.

Figure 3:
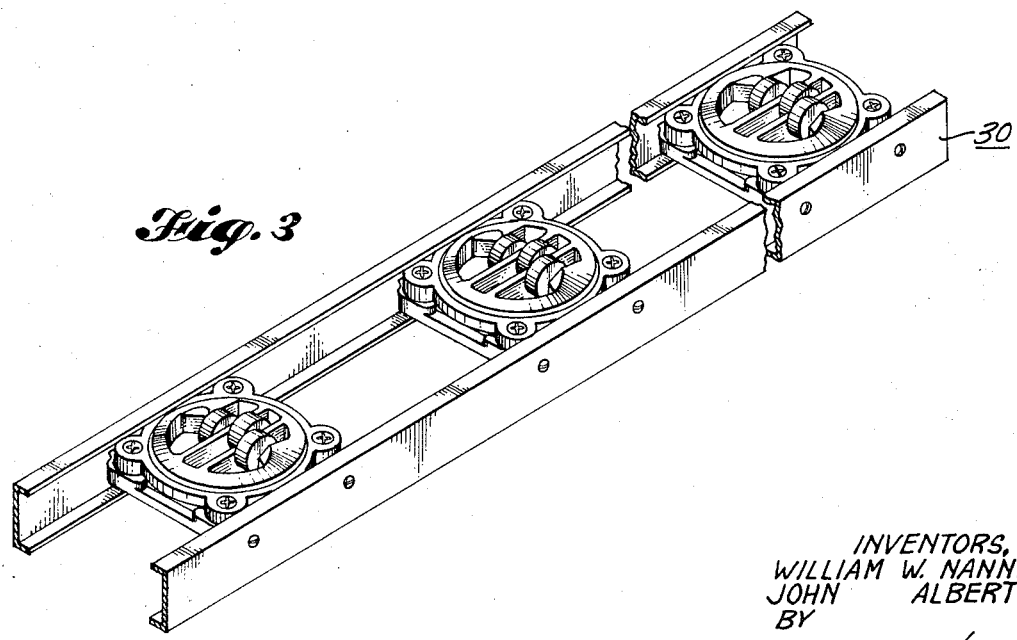
FIG. 3 is a tray arrangement with three installed casters as used in airplane cargo areas.

The caster 10 is normally mounted between channels 26 and 28 within a cargo floor and since the present invention was developed specifically for use in aircraft cargo areas such casters are generally pre-mounted in trays 30 as shown in FIG. 3.

Figure 5:
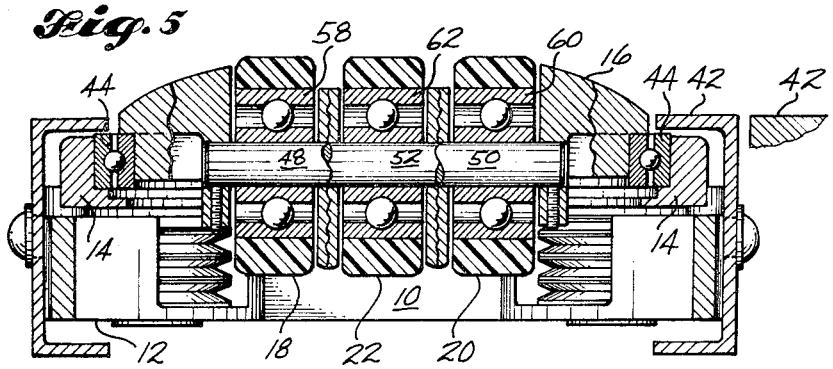
FIG. 5 is a section view taken from FIG. 2 along line 5—5.
Figure 6:
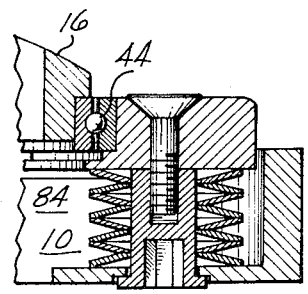
FIG. 6 is a section view taken from FIG. 7 along line 6—6.

The various intermediate components of the caster 10 are shown in the sectional view of FIG. 5 taken along each caster wheel axle.

Heavy duty springs 40 provide for a resilient fastened connection between the floor base 12 and the swivel base structure 14; however, these springs are used basically to obtain optimum load distribution over a group of casters in highly loaded areas and also in cases where cargo is received by the caster 10 from an elevated surface and more or less provide the caster 10 with a shock absorbing action. Thus, when cargo is slid upon the caster 10, only then such springs 40 can be omitted and the swivel base structure could even be mounted directly to the floor without the floor mounting base 12, which would provide an additional reduction to the already shallow height of the caster 10. As can be noted, the caster 10 is barely raised above the floor level 42 and the parts above the floor level 42 are rotationally engaged for the least frictional providing purposes. Therefore, a ring bearing 44 supports the axle support 16 on the swivel base structure 14. The axle support carries axles 48-50 and 52, and each axle carries a bearing 58-60 and 62, respectively, for rotationally supporting the caster wheels 18-20 and 22, respectively.

The above main components carry the intermediate components as described but this arrangement has been designed within the dimensions of the bases 14 and 16 and so that a maximum performance within minimum available space parameters is geometrically obtained.

Figure 4:
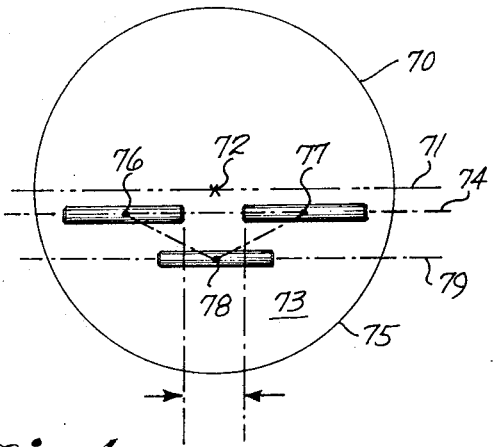
FIG. 4 shows the basic axle location with design parameters diagrammatically illustrated.

The circle 70 in FIG. 4 represents the periphery of the axle support structure 16 and the line 71 represents the diameter passing over the center 72 of the circle 70. Rotation of the circle 70 by a force parallel thereto can only be accomplished by friction at any place next to the center 72. Accordingly, a movable arrangement is made in a segment 73 located next to the diameter 71, which segment 73 is bordered by a first secant 74 and part of the periphery 70 indicated by 75. To support a load within a predetermined area shaped as the segment 73, triangularly spaced support points 76, 77 and 78 will be most efficient and carry this load in equal distribution. Because the load is not only supported but also has to be conveyed or transferred parallel to the circle 70, caster wheels or rollers on axles are to be installed at each point 76, 77 and 78; however, each caster wheel should have the largest periphery or diameter possible and, therefore, a second secant 79 parallel to the first secant 74 limits the triangular spaced pattern to points 76, 77, 78 due to the maximum radius of each caster wheel.

Figure 7:
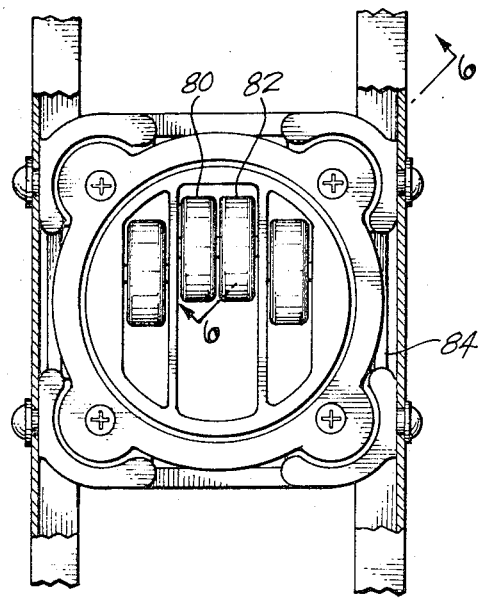
FIG. 7 shows a second embodiment of the basic caster in plan view fashion.

The caster wheel radius mounted on point 78 will interfere or cut perpendicularly the first secant 74 so that two axles 48 and 50 appear necessary rather than a one-axle support for two caster wheels; however, various modifications could be made as shown in FIG. 7 where a double center caster wheel arrangement 80 and 82 is used in caster 84 but its operation and design are within the basic engineering concept of the three wheel caster described above.

For this and other reasons it can be stated that, while the preferred embodiments of the invention have been herein described and illustrated, it should be understood that various modifications and alterations may be made without departing from the spirit of the invention or scope as defined by the appended claims.

Now, therefore, we claim:

1. A caster for receiving and conveying cargo comprising:
   a. a base structure carrying a ring bearing;
   b. a circular axle support structure disposed in said bearing for rotation about a substantially vertical axis;
   c. a first axle, a second center axle, and a third axle substantially horizontally carried by said circular axle support, wherein said first and said third axle are positioned apart and in alignment with one another coincident with a first secant of said circular support, and said second center axle is positioned coincident with a second smaller secant parallel to said first secant within said first secant segment and adjacently located to said apart position of said first and third axles, and
   d. a wheel mounted for rotation about each of said axles and arranged symmetrically with respect to a radius line normal to said first and second secants so as to be positioned in a triangular cargo support pattern for movement of the cargo in a direction substantially parallel to said radius line.

2. A caster for receiving and conveying cargo comprising:
   a. a base structure carrying a ring bearing;
   b. a circular axle support structure disposed in said bearing for rotation about a substantially vertical axis;
   c. a first axle, a second center axle, and a third axle substantially horizontally carried by said circular axle support, wherein said first and said third axle are positioned apart and in alignment with one another coincident with a first secant of said circular support, and said second center axle is positioned coincident with a second smaller secant parallel to said first secant within said first secant segment and adjacently located to said apart position of said first and third axles;
   d. caster wheels rotationally carried by each of said axles so that said wheels are arranged in a triangular supporting and conveying pattern for carrying associated cargo on a substantially horizontal plane formed by each said caster wheel cargo contacting tangent point; and
   e. said base structure is mounted to an associated cargo floor by means of spring resilient fasteners so that initial load impact when received is distributed and absorbed.

3. A caster for receiving and conveying cargo as claimed in claim 2 wherein said first, said center axle and said third axle are so positioned in said segment that said caster wheels have largest possible and equal diameters allowable within space parameters present in said segment of said circular axle support.

4. A caster for receiving and conveying cargo as claimed in claim 3 wherein said axle support is provided with an horizontally disposed upper surface having a slightly inclined angle for guiding said associated received cargo onto said wheels' tangent points.

5. A caster for receiving and conveying cargo as claimed in claim 4 wherein said wheels are provided with a convexly shaped riding surface.

6. A caster for receiving and conveying of cargo as claimed in claim 5 wherein at least three caster wheels are used within said segment.

7. A caster for receiving and conveying of cargo as claimed in claim 6 wherein said convexly shaped riding surface of said wheels and said inclined angle of said axle support are in alignment with one another for smooth reception of said associated cargo on said wheels.

* * * * *